United States Patent [19]

Dubrunfaut

[11] 4,190,361
[45] Feb. 26, 1980

[54] OPTICAL TELEMETERING APPARATUS
[75] Inventor: Gérard H. Dubrunfaut, Orly, France
[73] Assignee: Societe Anonyme de Telecommunications, Paris, France
[21] Appl. No.: 901,139
[22] Filed: Apr. 28, 1978
[30] Foreign Application Priority Data
  May 4, 1977 [FR] France ................ 77 13589
[51] Int. Cl.² .............. G01C 3/08; G01P 3/36
[52] U.S. Cl. ................................. 356/5; 356/28
[58] Field of Search ........... 356/5, 28; 343/8, 12 R, 343/17.1 R, 17.1 PC, 17.2
[56] References Cited
  U.S. PATENT DOCUMENTS
  3,765,768  10/1973  Budin et al. ............. 356/28
  4,057,800  11/1977  Ganz ................... 343/17.1 PF FOREIGN PATENT DOCUMENTS
  1585137  1/1970  France ................. 356/28

Primary Examiner—S. C. Buczinski
Attorney, Agent, or Firm—Jacobs & Jacobs

[57] ABSTRACT

The beam produced by a pulsed laser is directed onto a mobile and, once reflected, is heterodyned in a mixer with the light wave produced by a local laser operating in continuous mode.

A part of the beam produced by the local laser is directed onto the target. The output of the mixer is applied to an opto-electronic circuit which derives a composite electric signal which is separated by appropriate filters into a first component representative of the distance from the mobile and a second component representative of the radial velocity of the mobile.

4 Claims, 1 Drawing Figure

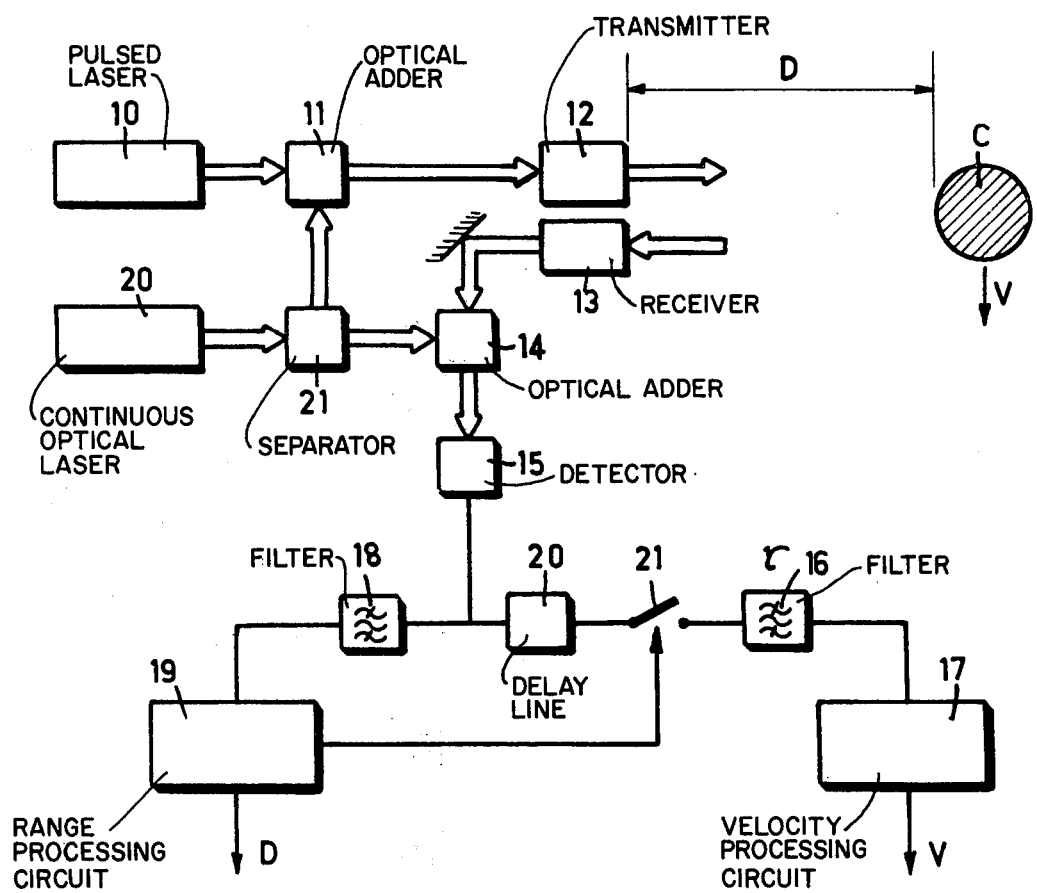

OPTICAL TELEMETERING APPARATUS

The present invention relates to an optical, particularly an infra-red telemetering apparatus, simultaneously furnishing the distance between a target and the apparatus and the radial velocity of this target.

Optical, particularly infra-red telemeters are known which comprise a pulsed laser. The light pulses produced by the laser are reflected by the target and return to their point of departure after a period of time proportional to the distance to be measured.

It is also known to measure the velocity of the target by means of a continuously operating laser, the frequency of the signal reflected by the target being, due to the Doppler effect, shifted with respect to the starting frequency by an amount proportional to the velocity. The frequency of transmission having to be very stable in this type of measurement, it is necessary to use a continuously operating laser. On the contrary, pulsed lasers are not suitable for this application as their frequency varies considerably from one pulse to the other.

It is known, on the other hand, in order to increase the sensitivity of reception of a telemeter, to effect a heterodyne detection, i.e. to beat the reflected signal with a continuous light signal supplied by a local oscillator and of near frequency, this local oscillator being a continuously operating laser.

It is an object of the invention to provide an optical device with heterodyne detection capable of supplying, in addition to the distance between the target and the apparatus, the value of the radial velocity of said target.

The concept of the invention consists in using the local oscillator of the telemeter as a transmitter of continuous signals with a view to measuring velocity.

The invention therefore relates to an optical telemeter with heterodyne detection of the type comprising a pulsed laser, an optical system at transmission for concentrating the energy supplied by the laser on a remote target, an optical system at reception for collecting part of the energy reflected by the target, a local oscillator for supplying a continuous light wave at a frequency near the operating frequency of the pulsed laser, an optical adder for adding the reflected radiation from the reception optical system and the radiation supplied by the local oscillator, a photodetector receiving the radiation from the optical adder and supplying an electric output signal at the beat frequency, and a processing circuit for deriving the distance between the target and the apparatus from the output signal of the photodetector, further comprising a second optical adder mounted between the pulsed laser and the transmission optical system, a separator for removing part of the radiation produced by the local oscillator and directing it towards said second optical adder and a second processing circuit for deriving the velocity of the target from the output signal of the photodetector.

French Patent No. 2 081 184 discloses a device for simultaneously measuring the distance and radial velocity of a target, but this known device uses a direct detection—and not a heterodyne detection—for measuring the distance, and the "distance" and "velocity" channels are strictly separate. The beam of the local laser is not directed onto the target and serves only to determine the Doppler shift.

French Patent No. 1 585 137 discloses another device for measuring the distance and velocity of a target. This known device comprises a single laser source operating alternately in pulsed mode, for measuring the distance, and in continuous mode, for measuring the velocity. The distance and velocity are therefore derived alternately, and not simultaneously. This known device does not use the heterodyne detection and also comprises "distance" and "velocity" channels which are completely separate.

The invention will be more readily understood on reading the following description with reference to the accompanying drawing, which shows in form of block diagram a telemeter according to the invention.

The apparatus shown in the drawing is directed to a target C remote from the apparatus by a distance D to be measured, and mowing at a radial velocity V, of which the apparatus must also provide the value.

The apparatus comprises a pulsed laser 10 which produces high power light signals of very short duration. It is for example a $CO_2$ laser of the TEA of Q-switch type operating at 10.6 $\mu$m, of average power 5 W. The light pulses have a duration of the order of 0.1 $\mu$s and the peak power is very high, of the order of 1 MW.

The operating frequency $F_o$ of the laser 10 is not defined with great accuracy, and may vary from one pulse to the other by 200 to 300 MHz. This instability of frequency is associated with the pulsating operation of the laser 10.

The radiation produced by the laser 10 is added in an optical adder 11 with the continuous radiation supplied by a continuously operating laser 20 by means of a separator 21. This laser 20 has an average power comparable with that of the laser 10 and a near frequency $F_L$. Contrary to laser 10, it has an extremely stable frequency and is suitable for measuring the velocity. A $CO_2$ laser will be used in the described embodiment.

The composite signal from the optical adder 11 is concentrated by a transmission optical system 12 on the target C. The reception optical system 13 collects part of the signal reflected by the target after a period of time which is substantially proportional to distance D. Moreover, the reflected signal has undergone, by the Doppler effect, a shift in frequency $F_D$ proportional to the radial velocity V of the target.

As to the optical systems 12 and 13, it should be noted that they may be implemented in the form of a single optical system provided with a transmission-reception duplexer.

The apparatus also comprises an optical adder 14 and a photodetector 15, for example a photovoltaic detector, to beat the composite reflected signal with the signal delivered by the laser 20 and transmitted by the separator 21, of frequency $F_L$. The signal from the separator 21 and the one issuing from the reception optical system 13 are added in the optical adder 14 and their sum creates at the output of the detector 15 a composite electric signal.

This composite signal comprises a first component originating from the pulsed laser 10, of high peak power and unknown frequency. This component serves to determine the distance D. Its frequency is equal to $(F_o+F_D)-F_L$ and is known with a very poor accuracy, in view of the uncertainty of $F_o$, of the order of 200 to 300 MHz.

The composite signal comprises a second component originating from the continuously operating laser 20, thus of low peak power. Its frequency is $(F_L+F_D)-F_L=F_D$. In the described embodiment of a laser operating at 10.6 $\mu$m, the shift due to the Doppler effect is 1 MHz if the velocity V of the target is 5 m/s and 20 MHz if V=100 m/s (360 km/h). The uncertainty of the frequency $F_D$ of this second component is therefore much less than the uncertainty of the frequency of the first component.

The two components are therefore very easy to separate by means of two filters 16,18 in parallel, the bandwidths of which are suitably defined. The filter 16 presents a narrow bandwidth, for example 20 MHz, corresponding to the values which may be taken by the Doppler shift $F_D$, and filter 18 presents, on the contrary, a wide bandwidth, for example 300 MHz which covers the values which may be taken by the frequency $F_o+F_D-F_L$ of the first component.

The signal from the filter 16 is applied to a processing circuit 17 which supplies the velocity V of the target and the signal from the filter 18 is applied to a processing circuit 19 which gives distance D.

The filter 16 may be constituted either by a single bandpass filter of fixed frequency or, if necessary, by a set of filters or by a phase or frequency-controlled oscillator according to the techniques used in so-called Doppler tracking receivers.

The embodiment shown further comprises a delay line 20 and an electronic switch 21 mounted between the detector 15 and the filter 16, the switch 21 being controlled by the circuit 19. When the presence of a short high-amplitude signal, originating from laser 10, is recognized by the circuit 19, the latter actuates the opening of the switch 21 which prevents the signal from being applied to the filter 16. The delay line 20 enables the synchronism between the opening of the switch 21 and the arrival of the signal which is to be eliminated, to be adjusted.

The filtering effect of the filter 16 is thus completed. If, however, it is considered sufficient in itself, in view of the respective levels of the two components, the detector 15 may be directly connected to the filter 16.

Finally, the measurement of the velocity is obtained by very simple means from a conventional laser telemeter with heterodyne detection, since the only elements added with respect to the conventional apparatus are the mixer 11, the separator 21, the filter 16 and the processing circuit 17, due to the fact that the laser 20 used for the heterodyne detection also serves to measure the velocity.

The apparatus according to the invention will advantageously be used in fire control, particularly on land vehicles.

What is claimed is:

1. An optical telemeter with heterodyne detection of the type comprising a pulsed laser, an optical system at transmission for concentrating the energy supplied by the laser on a remote target, an optical system at reception for collecting part of the energy reflected by the target, a local oscillator for supplying a continuous light wave at a frequency near the operating frequency of the pulsed laser, first optical adder means for adding the reflected radiation from the reception optical system and the radiation supplied by the local oscillator, a photodetector receiving the radiation from said first optical adder means and supplying an electric output signal at the beat frequency, and a processing circuit for deriving the distance between the target and the apparatus from the output signal of the photodetector, second optical adder means mounted between the pulsed laser and the transmission optical system, a separator for diverting part of the radiation produced by the local oscillator and directing it towards said second optical adder means thereby to direct on said target a composite optical signal having a pulsed component and a continuous component, and a second processing circuit for deriving the velocity of the target from the output signal of the photodetector.

2. A device as claimed in claim 1, wherein the first processing circuit comprises a filter with a wide bandwidth and the second processing circuit comprises a filter with a narrow bandwidth.

3. A device as claimed in claim 2, wherein a delay line and a switch are connected between the photodetector and the filter of the second processing circuit, the opening of the switch being actuated when a signal is passed through said first processing circuit.

4. A device as claimed in any one of claims 1 and 2, wherein the pulsed laser and the local oscillator have comparable average powers.

* * * * *